United States Patent
Kim et al.

(10) Patent No.: US 10,728,812 B2
(45) Date of Patent: Jul. 28, 2020

(54) METHOD AND APPARATUS FOR SUPPORTING MBMS SERVICE CONTINUITY

(71) Applicant: LG ELECTRONICS INC., Seoul (KR)

(72) Inventors: Sangwon Kim, Seoul (KR); Youngdae Lee, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 16/313,780

(22) PCT Filed: Aug. 9, 2017

(86) PCT No.: PCT/KR2017/008601
§ 371 (c)(1),
(2) Date: Dec. 27, 2018

(87) PCT Pub. No.: WO2018/030776
PCT Pub. Date: Feb. 15, 2018

(65) Prior Publication Data
US 2019/0230564 A1     Jul. 25, 2019

Related U.S. Application Data

(60) Provisional application No. 62/373,362, filed on Aug. 11, 2016, provisional application No. 62/373,361, filed on Aug. 11, 2016.

(30) Foreign Application Priority Data

Aug. 2, 2017    (KR) ........................ 10-2017-0097953

(51) Int. Cl.
*H04W 36/06*     (2009.01)
*H04W 36/16*     (2009.01)
(Continued)

(52) U.S. Cl.
CPC ............. *H04W 36/06* (2013.01); *H04W 4/06* (2013.01); *H04W 36/165* (2013.01);
(Continued)

(58) Field of Classification Search
CPC ... H04W 4/06; H04W 36/00; H04W 36/0007; H04W 36/0079; H04W 36/06;
(Continued)

(56) References Cited

U.S. PATENT DOCUMENTS 9,686,770 B2 *   6/2017   Hsu .................... H04W 36/0007
10,292,079 B2 *   5/2019   Lee ....................... H04W 24/08
(Continued)

FOREIGN PATENT DOCUMENTS

KR    10-2015-0065842 A    6/2015
KR    10-2016-0079043 A    7/2016

OTHER PUBLICATIONS

Nokia Networks "MBMS interest indication by SC-PTM capable UE", R2-162038, 3GPP TSG-RAN WG 2 Meeting #93, St. Julian's, Malta, Feb. 15-19, 2016, total 6 pages.

*Primary Examiner* — Tri H Phan
(74) *Attorney, Agent, or Firm* — Birch, Stewart, Kolasch & Birch, LLP

(57) ABSTRACT

Provided are a method for supporting multimedia broadcast multicast service (MBMS) service continuity by a terminal in a wireless communication system and an apparatus supporting the same. The method may comprise the steps of: entering an RRC state in which cell reselection is not supported; determining whether an MBMS service of interest can be received at a serving frequency for the terminal; and when it is determined that the MBMS service of interest cannot be received at the serving frequency, transmitting an MBMS interest indication message to a network, wherein the terminal may be a terminal not supporting a handover.

15 Claims, 11 Drawing Sheets

(51) Int. Cl.
  *H04W 36/30* (2009.01)
  *H04W 4/06* (2009.01)
  *H04W 76/19* (2018.01)
  *H04W 76/30* (2018.01)
  *H04W 36/00* (2009.01)

(52) U.S. Cl.
  CPC ........... *H04W 36/30* (2013.01); *H04W 76/19* (2018.02); *H04W 76/30* (2018.02); *H04W 36/0007* (2018.08)

(58) Field of Classification Search
  CPC ..... H04W 36/08; H04W 36/16; H04W 36/18; H04W 36/24; H04W 36/30; H04W 36/34; H04W 36/36; H04W 36/165; H04W 36/305; H04W 48/08; H04W 76/046; H04W 76/19; H04W 76/25; H04W 76/27; H04W 76/30; H04W 76/34; H04W 76/40
  See application file for complete search history.

(56) References Cited

U.S. PATENT DOCUMENTS

| | | | |
|---|---|---|---|
| 10,299,083 B2 * | 5/2019 | Kim | H04W 76/27 |
| 10,531,348 B2 * | 1/2020 | Kim | H04W 36/30 |
| 2014/0341188 A1 | 11/2014 | Chang et al. | |
| 2015/0071160 A1 | 3/2015 | Zeng et al. | |
| 2019/0281525 A1 * | 9/2019 | Lee | H04W 36/0085 |
| 2019/0289504 A1 * | 9/2019 | Kim | H04W 36/0085 |

\* cited by examiner

FIG. 3
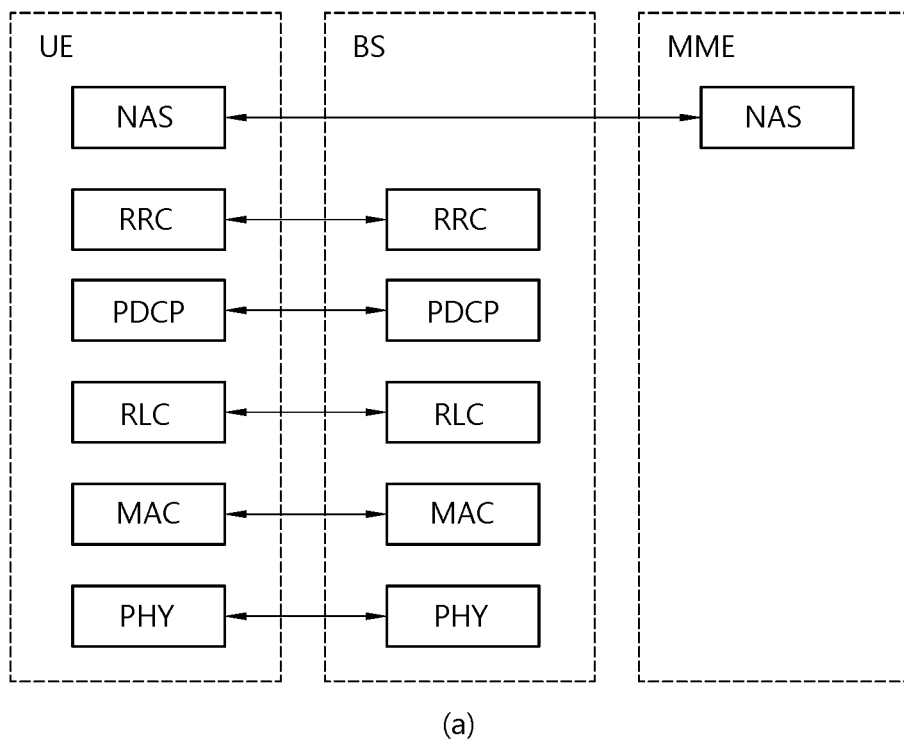
(a)
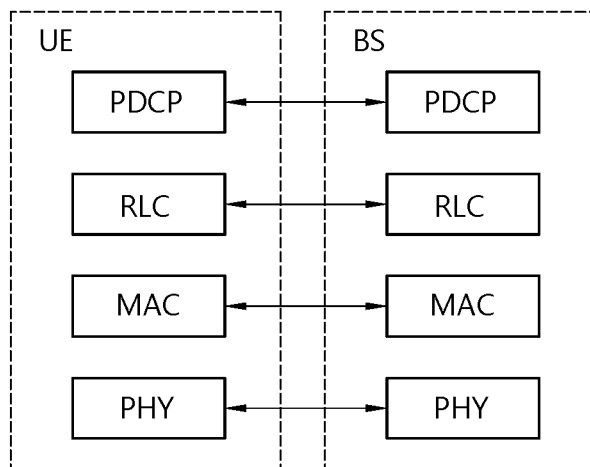
(b)

METHOD AND APPARATUS FOR SUPPORTING MBMS SERVICE CONTINUITY

CROSS REFERENCE TO RELATED APPLICATIONS

This application is the National Phase of PCT/KR2017/008601 filed on Aug. 9, 2017, which claims priority under 35 U.S.C. § 119(e) to U.S. Provisional Application Nos. 62/373,362 filed on Aug. 11, 2016; and 62/373,361 filed on Aug. 11, 2016 and under 35 U.S.C. § 119(a) to Patent Application No. 10-2017-0097953 filed in the Republic of Korea on Aug. 2, 2017, all of which are hereby expressly incorporated by reference into the present application.

BACKGROUND OF THE INVENTION

Field of the Invention

The present invention relates to a wireless communication system, and more particularly, to a method of supporting multimedia broadcasting multicast service (MBMS) service continuity for a UE, and an apparatus supporting the method.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A Multimedia Broadcast/Multicast Service (MBMS) is a service of simultaneously transmitting a data packet to a plurality of users, similar to an existing Cell Broadcast Service (CBS). However, the CBS is a low-speed message-based service, while the MBMS is designed for high-speed multimedia data transmission. Further, the CBS is not Internet Protocol (IP)-based, whereas the MBMS is based on IP multicast. According to the MBMS, when users of a certain level are present in the same cell, the users are allowed to receive the same multimedia data using a shared resource (or channel), and thus the efficiency of radio resources may be improved and the users may use a multimedia service at low costs.

The MBMS uses a shared channel so that a plurality of UEs efficiently receives data on one service. A BS allocates only one shared channel for data on one service, instead of allocating as many dedicated channels as the number of UEs to receive the service in one cell. The plurality of UEs simultaneously receives the shared channel, thus improving the efficiency of radio resources. Regarding the MBMS, a UE may receive the MBMS after receiving system information on the cell.

An important communication technique such as public safety or group communication system enablers for LTE (GCSE_LTE) has been introduced in Rel-12. In Rel-12 GCSE, group communication has been designated as eMBMS. The eMBMS is designed to supply media content to a pre-planned wide area (i.e., an MBSFN area). The MBSFN area is rather static (e.g., configured by O&M), and cannot be dynamically adjusted according to user distribution. Even if all radio resources of a frequency domain are not used, eMBMS transmission may occupy a full system bandwidth, and multiplexing with unicast is not allowed in the same subframe. An MBSFN subframe configuration is also rather static (e.g., configured by O&M). That is, an MBSFN subframe cannot be dynamically adjusted according to the number of dynamic groups and a traffic load of a dynamic group. Therefore, when providing an importance communication service, a radio resource configuration for the eMBMS may be unnecessarily wasted. Therefore, single-cell point-to-multipoint (SCPTM) transmission is proposed for an effective use of the radio resource. While identifiable signals are transmitted simultaneously in a plurality of cells in the MBSFN transmission, the MBMS service is transmitted in a single cell in the SCPTM transmission.

In recent years, machine-to-machine/Internet of Things (M2M/IoT), which connects all every objects through networks to facilitate obtaining and transmitting necessary information anytime and anywhere, thereby making it possible to offer and use various services, has become a major issue for a next-generation communication market.

While early M2M started with a sensor and an RFID network mainly for local areas, various wired/wireless networks may be used with gradually diversifying purposes and characteristics of applications. Recently, M2M based on a mobile communication network receives growing attention in view of the mobility of objects, a wide range of service areas including not only islands and mountains but also the sea, ease of network management and maintenance, security for reliable data transmission, and guarantee of service quality. Accordingly, with studies on the feasibility of M2M started in 2005, the 3GPP has been conducting a full-scale standardization project under the name "Machine Type Communications (MTC)" since 2008.

The 3GPP regards a machine as an entity that does not require direct human manipulation or intervention and defines MTC as a form of data communication involving one or more of machines. Typical examples of the machine include a smart meter and a vending machine that are equipped with a mobile communication module. Recently, with the introduction of a smart phone that performs communication by automatically connecting to a network, without any user operation or intervention, depending on a user's location or conditions, a mobile terminal having an MTC function is considered as a form of a machine. Also, a gateway-type MTC device connected to an IEEE 802.15 WPAN-based subminiature sensor or RFID is also considered.

Internet of Things (IoT) is a future infrastructure and service of information communication for the future, in which all things are connected to the Internet to directly communicate with each other. Although the IoT is necessary to improve quality of life and productivity on the basis of a super-connected society, the IoT is important ultimately because it forms an infrastructure of a nation, and further, a central nervous system for humanity and the Earth. The IoT is in an initial stage not having a significant profit model yet. However, a market scale of the IoT as a new paradigm of the 21st century is more than 10 times the existing cellular communication market, and is expected to grow rapidly. The IoT is roughly divided into cellular mobile communication based IoT (CIoT) and non-cellular based IoT.

SUMMARY OF THE INVENTION

Meanwhile, some UEs may not support a handover as well as measurement reporting. Even though the UE not supporting the handover as well as the measurement reporting transmits a multimedia broadcast multicast service (MBMS) interest indication message to a network, the network cannot handover the UE at a frequency for providing an MBMS service of interest. That is, the existing MEMS service continuity mechanism based on the MBMS interest indication message is not able to provide the MBMS service continuity to the UEs not supporting the measurement reporting or the handover. Accordingly, there is a need to propose a method of providing MBMS service continuity to UEs not supporting measurement reporting or a handover and an apparatus supporting the method.

According to an embodiment, there is provided a method of supporting MBMS service continuity by a UE in a wireless communication system. The method may include: entering a radio resource control (RRC) state in which cell reselection is not supported; determining whether an MBMS service of interest can be received from a serving frequency for the UE; and when it is determined that the MBMS service of interest cannot be received from the serving frequency, transmitting an MBMS interest indication message to a network, wherein the UE is a UE not supporting a handover.

The method may further include receiving from the network an RRC connection release message in response to the transmitted MBMS interest indication message. The method may further include entering an RRC_IDLE state in response to the received RRC connection release message. The method may further include performing cell reselection to a neighboring cell providing the MBMS service of interest. The method may further include receiving the MBMS service of interest from the reselected neighboring cell. The MBMS service of interest may be received via multimedia broadcast single frequency network (MBSFN) transmission or single cell point to multipoint (SCPTM) transmission.

The method may further include: receiving a system information block from the serving frequency after entering the RRC_IDLE state; and determining a neighboring cell providing the MBMS service of interest on the basis of the system information block. The method may include considering at least any one cell having cell quality exceeding a threshold among the neighboring cells providing the MBMS service of interest, as a target cell of cell reselection. The threshold may be received from the serving frequency. The cell quality may be at least any one of reference signal received power (RSRP) and reference signal received quality (RSRQ). The method may further include performing a cell reselection procedure on the considered at least one target cell.

The method may further include considering at least any one cell, which fulfills a cell selection criterion S among the neighboring cells providing the MBMS service of interest, as the target cell of the cell reselection.

The network may be a radio access technology (RAT) not supporting the handover.

The UE may be at least any one of an NB-IoT UE, a CIoT UE, an IoT UE, and an eMTC UE.

According to another embodiment, there is provided a UE supporting MBMS service continuity in a wireless communication system. The UE may include: a memory; a transceiver; and a processor coupling the memory and the transceiver. The processor may configured to: enter an RRC state in which cell reselection is not supported; determine whether an MBMS service of interest can be received from a serving frequency for the UE; and when it is determined that the MBMS service of interest cannot be received from the serving frequency, control the transceiver to transmit an MBMS interest indication message to a network. The UE may be a UE not supporting a handover.

A UE not supporting measurement reporting or a handover can receive an MBMS service of interest.

BRIEF DESCRIPTION OF THE DRAWINGS

FIG. 3 shows a control plane and a user plane of a radio interface protocol of an LTE system.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
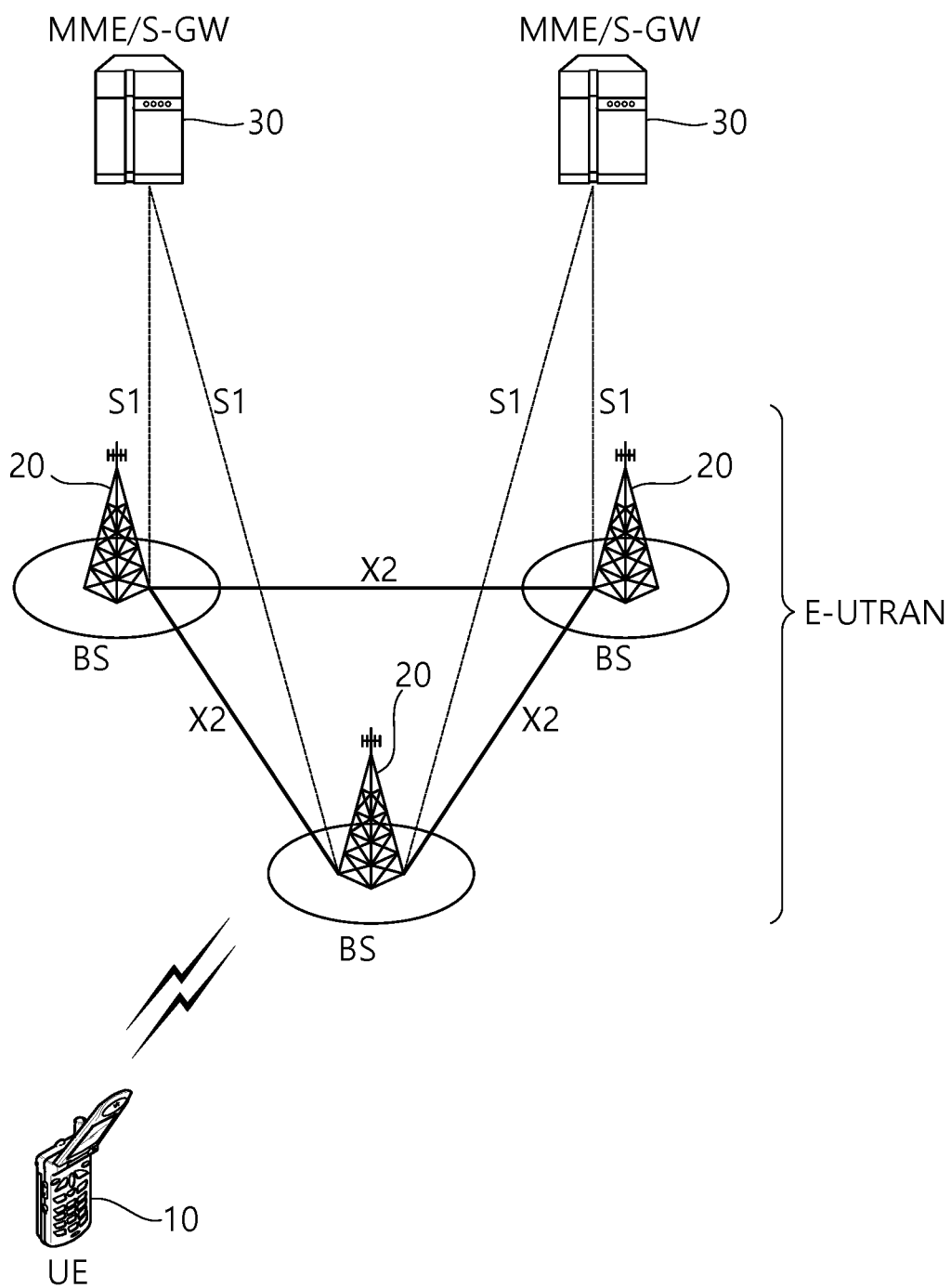
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
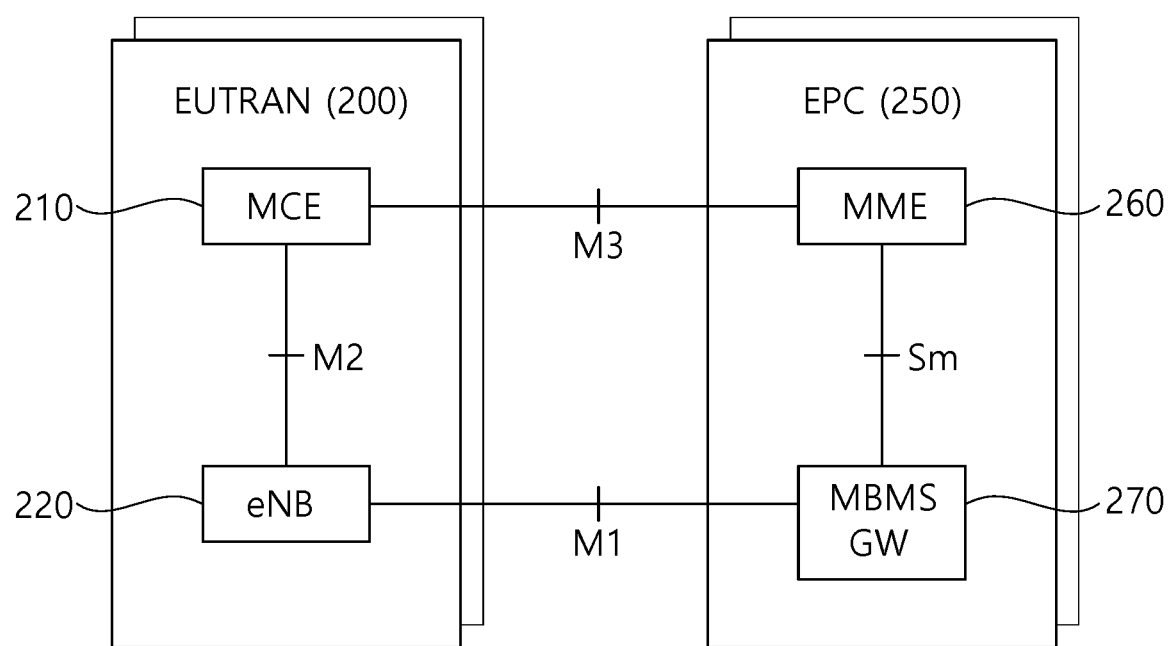
FIG. 2 shows a network architecture for an MBMS.

FIG. 2 shows a network architecture for a Multimedia Broadcast/Multicast Service (MBMS).

Referring to FIG. 2, the radio access network (EUTRAN, 200) includes a multi-cell coordination entity (hereinafter, "MCE", 210) and a base station (eNB, 220). The MCE 210 is a main entity for controlling the MBMS and plays a role to perform session management, radio resource allocation or admission control of the base station 220. The MCE 210 may be implemented in the base station 220 or may be implemented independent from the base station 220. The interface between the MCE 210 and the base station 220 is called M2 interface. The M2 interface is an internal control plane interface of the radio access network 200 and MBMS control information is transmitted through the M2 interface. In case the MCE 210 is implemented in the base station 220, the M2 interface may be present only logically.

The EPC (Evolved Packet Core, 250) includes an MME 260 and an MBMS gateway (GW) 270. The MBMS gateway 270 is an entity for transmitting MBMS service data and is positioned between the base station 220 and the BM-SC and performs MBMS packet transmission and broadcast to the base station 220. The MBMS gateway 270 uses a PDCP and IP multicast to transmit user data to the base station 220 and performs session control signaling for the radio access network 200.

The interface between the MME 260 and the MCE 210 is a control plane interface between the radio access network 200 and the EPC 250 and is called M3 interface. Control information related to MBMS session control is transmitted through the M3 interface. The MME 260 and the MCE 210 transmits, to the base station 220, session control signaling such as a session start/stop message for session start or session stop, and the base station 220 may inform the UE through a cell notification that the corresponding MBMS service has been started or stopped.

The interface between the base station 220 and the MBMS gateway 270 is a user plane interface and is called M1 interface.

FIG. 3 shows a control plane and a user plane of a radio interface protocol of an LTE system. FIG. 3(a) shows a control plane of a radio interface protocol of an LTE system. FIG. 3(b) shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 3(a), the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3(b), the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an MBMS and a multicast/broadcast single frequency network (MBSFN) are described.

MBSFN transmission or MBSFN-mode transmission refers to a simultaneous transmission scheme in which a plurality of cells transmits the same signal at the same time. MBSFN transmissions from a plurality of cells within an MBSFN area are perceived as a single transmission for a UE.

The MBMS service may be managed or localized in a cell-based or geography-based manner. An area in which a specific MBMS service is provided is widely referred to as an MBMS service area. For example, if an area in which a specific MBSMS service A proceeds is an MBMS service area A, a network in the MBMS service area A may be in a state of transmitting the MBMS service A. In this case, the UE may receive the MBMS service A according to a UE capability. The MBMS service area may be defined in terms of an application and a service as to whether a specific service is provided in a specific area.

A transport channel for the MBMS, that is, a multicast channel (MCH), may be mapped to a logical channel, e.g., a multicast control channel (MCCH) or a multicast traffic channel (MTCH). The MCCH transmits an MBMS-related RRC message, and the MTCH transmits a traffic of a specific MBMS service. One MCCH exists in every one MBMS single frequency network (MBSFN) region for transmitting the same MBMS information/traffic. The MCCH includes one MBSFN region configuration RRC message, and has a list of all MBMS services. If the MBMS-related RRC message is changed in a specific MCCH, a physical downlink control channel (PDCCH) transmits an MBMS radio network temporary identity (M-RNTI) and an indication for indicating the specific MCCH. The UE which supports the MBMS may receive the M-RNTI and the MCCH indication through the PDCCH, may recognize that the MBMS-related RRC message is changed in the specific MCCH, and may receive the specific MCCH. The RRC message of the MCCH may be changed in every modification period, and is broadcast repetitively in every repetition period. A notification mechanism is used to inform an MCCH change caused by a presence of an MCCH session start or MBMS counting request message. The UE detects the MCCH change informed without having to depend on the notification mechanism through MCCH monitoring in the modification period. The MTCH is a logical channel on which an MBMS service carried. If many services are provided in an MBSFN region, a plurality of MTCHs may be configured.

A UE may also be provided with a dedicated service while being provided with an MBMS service. For example, a user may chat on the user's own smartphone using an instant messaging (IM) service, such as MSN or Skype, simultaneously with watching a TV on the smartphone through an MBMS service. In this case, the MBMS service is provided through an MTCH received by a plurality of UEs at the same time, while a service provided for each individual UE, such as the IM service, is provided through a dedicated bearer, such as a dedicated control channel (DCCH) or dedicated traffic channel (DTCH).

In one area, a BS may use a plurality of frequencies at the same time. In this case, in order to efficiently use radio resources, a network may select one of the frequencies to provide an MBMS service only in the frequency and may provide a dedicated bearer for each UE in all frequencies. In this case, when a UE, which has been provided with a service using a dedicated bearer in a frequency where no MBMS service is provided, wishes to be provided with an MBMS service, the UE needs to be handed over to an MBMS providing frequency. To this end, the UE transmits an MBMS interest indication to a BS. That is, when the UE wishes to receive an MBMS service, the UE transmits an MBMS interest indication to the BS. When the BS receives the indication, the BS recognizes that the UE wishes to receive the MBMS service and hands the UE over to an MBMS providing frequency. Here, the MBMS interest indication is information indicating that the UE wishes to receive an MBMS service, which additionally includes information on a frequency to which the UE wishes to be handed over.

The UE, which wishes to receive a specific MBMS service, first identifies information on a frequency at which the specific service is provided and information on broadcast time at which the specific service is provided. When the MBMS service is already on air or is about to be on air, the UE assigns a highest priority to the frequency at which the MBMS service is provided. The UE performs a cell reselection procedure using reset frequency priority information and moves to a cell providing the MBMS service to receive the MBMS service.

When the UE is receiving an MBMS service or is interested in receiving an MBMS service and when the UE is allowed to receive an MBMS service while camping on an MBMS service-providing frequency, it may be considered that the frequency is assigned a highest priority during an MBMS session as long as the following situations last while the reselected cell is broadcasting SIB13.

When SIB15 of a serving cell indicates that one or more MBMS service area identities (SAIs) are included in the user service description (USD) of the service.

SIB15 is not broadcast in a serving cell, and the frequency is included in the USD of the service.

A UE needs to be able to receive an MBMS in RRC_IDLE and RRC_CONNECTED states.

Figure 4:
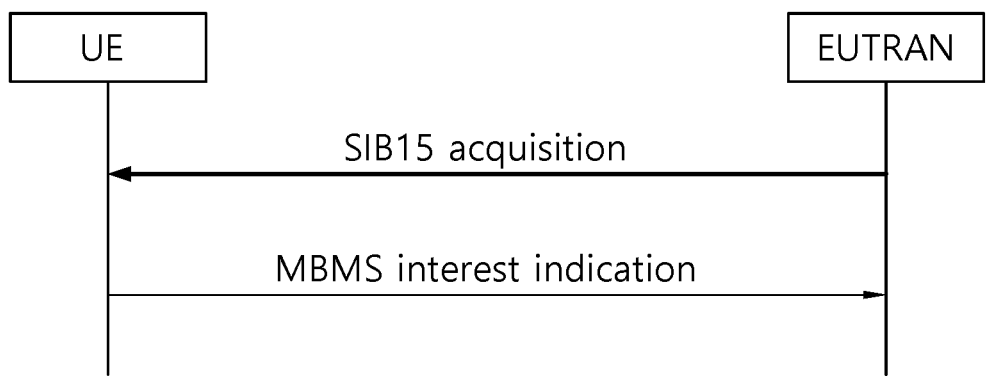
FIG. 4 shows an example of transmitting system information for an MBMS service and an MBMS interest indication message.

FIG. 4 shows an example of transmitting system information for an MBMS service and an MBMS interest indication message.

Referring to FIG. 4, the base station transmits a system information block 15 (SIB15) to the user equipment (or terminal). SIB15 corresponds to system information that is defined for an MBMS service. SIB15 may include MBMS service area identities (SIAs) of the current and/or neighboring carrier frequencies. Table 1 shown below represents an example of the SIB15.

TABLE 1

```
ASN1START
SystemInformationBlockType15-r11 ::= SEQUENCE {
sai-IntraFreq-r11 MBMS-SAI-List-r11 OPTIONAL, -- Need OR
sai-InterFreqList-r11 MBMS-SAI-InterFreqList-r11 OPTIONAL, -- Need OR
lateNonCriticalExtension OCTET STRING OPTIONAL, -- Need OP
...
}
MBMS-SAI-List-r11 ::= SEQUENCE (SIZE (1..maxSAI-MBMS-r11)) OF MBMS-SAI-r11
MBMS-SAI-r11::= INTEGER (0..65535)
MBMS-SAI-InterFreqList-r11 ::= SEQUENCE (SIZE (1..maxFreq)) OF MBMS-SAI-InterFreq-r11
MBMS-SAI-InterFreq-r11 ::= SEQUENCE {
dl-CarrierFreq ARFCN-ValueEUTRA,
sai-List-r11 MBMS-SAI-List-r11,
...
}
--ASN1STOP
```

In Table 1, the sai-IntraFreq field includes a list of MBMS service area identities of the carrier frequency to which the user equipment is currently accessing (or attached). The sai-InterFreqList field includes a list of neighboring frequencies providing an MBMS service and a corresponding list of MBMS service area identities. The sai-List field includes a list of MBMS service area identities for a specific frequency.

The user equipment, which is in a RRC connected state, transmits an MBMS interest indication message to the base station through an MBMS point to multipoint radio bearer (MRB). The user equipment may notify the frequency from which the user equipment is receiving an MBMS service, or the frequency providing the MBMS service, which the user equipment is interested in receiving (hereinafter referred to as an MBMS service of interest), to the base station through the MBMS interest indication message. The user equipment may also notify the frequency from which the user equipment is no longer receiving an MBMS service, or the frequency providing the MBMS service, which the user equipment is no longer interested in receiving (hereinafter referred to as an MBMS service of no interest), to the base station through the MBMS interest indication message. Additionally, the user equipment may notify whether or not it prioritizes the reception of the MBMS service over a unicast reception through the MBMS interest indication message. The MBMS interest indication message may be transmitted through a dedicated control channel (DCCH). A signaling radio bearer (SRB) for the MBMS interest indication message corresponds to SRB1, and the MBMS interest indication message may be transmitted based on a verification mode. Table 2 shown below represents an example of the MBMS interest indication message.

TABLE 2

```
ASN1START
MBMSInterestIndication-r11 ::= SEQUENCE {
criticalExtensions CHOICE {
c1 CHOICE {
interestIndication-r11 MBMSInterestIndication-r11-IEs,
spare3 NULL, spare2 NULL, spare1 NULL
},
criticalExtensionsFuture SEQUENCE { }
```

TABLE 2-continued

```
    }
  }
  MBMSInterestIndication-r11-IEs ::= SEQUENCE {
    mbms-FreqList-r11    CarrierFreqListMBMS-r11 OPTIONAL,
    mbms-Priority-r11    ENUMERATED {true} OPTIONAL,
    lateNonCriticalExtension OCTET STRING OPTIONAL,
    nonCriticalExtension SEQUENCE { } OPTIONAL
  }
-- ASN1STOP
```

In Table 2, the mbms-FreqList field indicates a list of frequencies from which the user equipment is receiving an MBMS service, or frequencies providing MBMS services, which the user equipment is interested in receiving (hereinafter referred to as MBMS services of interest). The mbms-Priority field indicates whether or not the user equipment prioritizes an MBMS service reception over a unicast reception. In case the user equipment prioritizes the reception of all frequencies providing the MBMS services over the reception of a unicast bearer, the value of the mbms-Priority field may be 'True'. If not, the mbms-Priority field may be omitted.

The base station, which has received the MBMS interest indication message, may be aware that the user equipment is interested in shifting (or relocating) to a cell that is operated by a frequency providing an MBMS service. The base station may handover the user equipment to a cell of a specific frequency, which provides a specific MBMS service, and, after the handover of the user equipment, the base station allows the user equipment to be capable of easily receiving the MBMS service. Additionally, in case the user equipment is handed over from a first base station to a second base station, the first base station may deliver the MBMS interest indication message, which is received from the user equipment, to the second base station through an MBMS UE context. More specifically, the user equipment is not required to transmit the MBMS interest indication message one more time to the second base station. Even after the user equipment is handed over to the second base station, the second base station may allow the user equipment to be capable of continuously receiving the MBMS service easily.

Hereinafter, a Single-Cell Point-to-Multipoint (SCPTM) transmission will be described in detail.

The method for transmitting an MBMS service includes an SCPTM transmission and a Multimedia Broadcast multicast service Single Frequency Network (MBSFN) transmission. The MBSFN transmission transmits a signal that can be simultaneously identified by a plurality of cells, whereas the SCPTM transmission transmits an MBMS service from a single cell. Therefore, unlike the MBSFN transmission, inter-cell synchronization is not required in the SCPTM transmission. Additionally, unlike the MBSFN transmission, since the SCPTM transmission uses the conventional PDSCH without any modification, the SCPTM transmission has the characteristics of a unicast. More specifically, a plurality of user equipments reads the same PDCCH and acquires an RNTI for each service, so as to receive the SCPTM service. An SCPTM-dedicated MCCH was adopted, and, when the user equipment determines that the service it wishes to receive corresponds to an SCPTM service through the MCCH, the user equipment acquires the corresponding RNTI value. And, by reading the PDCCH through the corresponding RNTI, the user equipment may receive the SCPTM service.

Hereinafter, Internet of Things (IoT) is Described.

Figure 5:
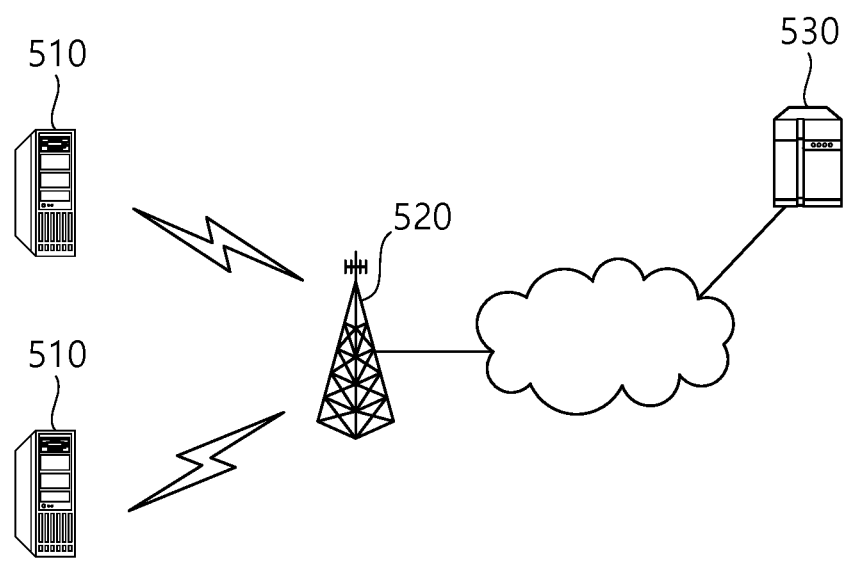
FIG. 5 shows an example of IoT communication.

FIG. 5 shows an example of IoT communication.

IoT refers to information exchange between IoT UEs 510 without human interaction via a BS 520 or information exchange between the IoT UE 510 and an MTC server 530 via the BS. A service provided using the IoT is differentiated from the existing communication service with human intervention, and there are various categories of services such as tracking, metering, payment, medical field services, remote controlling, or the like. More specifically, the service provided using the IoT may include reading a meter, measuring a water level, utilizing a camera, inventory reporting of a vending machine, or the like. For convenience, a low cost/low specification UE which primarily aims at data communication for providing such a service may be called an IoT UE, an MTC UE, or a low complexity type UE.

The IoT server 530 is an entity for communicating with the IoT UE 510. The IoT server 530 executes an IoT application, and provides an IoT-specific service to the IoT UE. The IoT UE 510 is a wireless device for providing IoT communication, and may be fixed or mobile.

In case of the IoT UE, a transmission data amount is low, and uplink/downlink data is transmitted and received not frequently. Therefore, it is effective to decrease a unit cost of the UE and to decrease a battery consumption according to a low data transmission rate. The IoT UE has a small mobility, and thus has a characteristic in that a channel environment is almost not changed.

Figure 6:
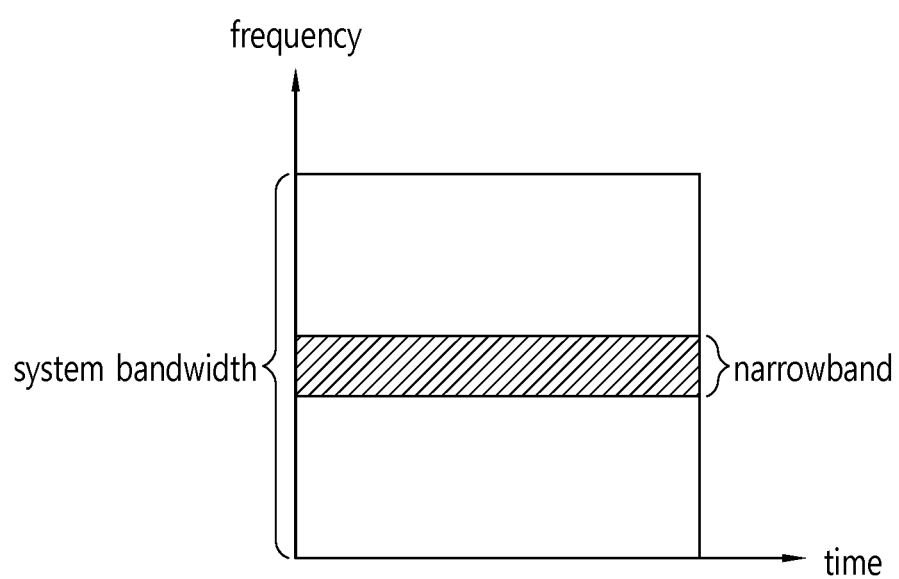
FIG. 6 and FIG. 7 show an example of a narrow band at which an IoT device operates.
Figure 7:
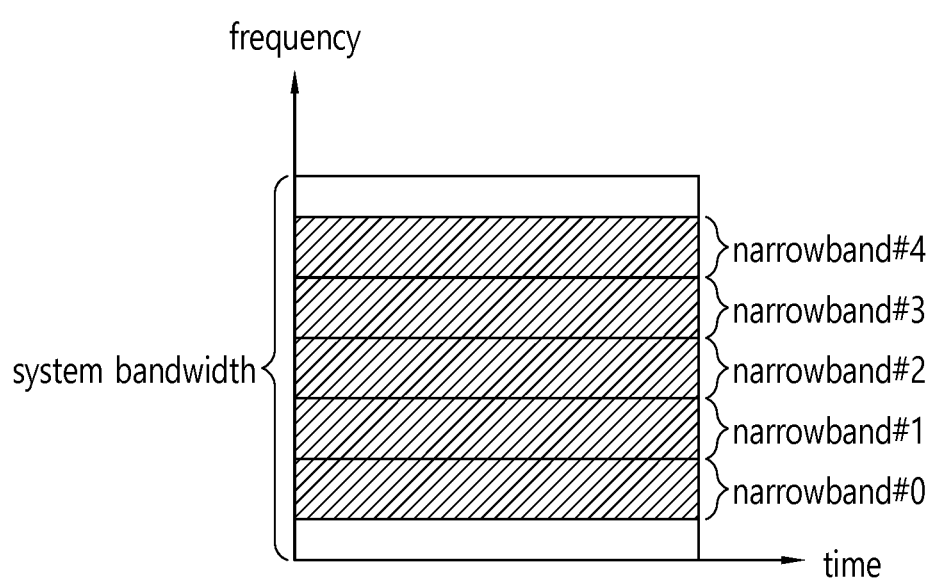

FIG. 6 and FIG. 7 show an example of a narrow band at which an IoT device operates.

As one way of implementing an IoT UE with low cost, the IoT UE may use a narrow band irrespective of a system bandwidth of a cell. For example, the narrow band may have a bandwidth of about 1.4 MHz. In this case, as shown in FIG. 6, a narrow band region in which the IoT UE operates may be located in a central region (e.g., six PRBs in the middle) of the system bandwidth of the cell. Alternatively, as shown in FIG. 7, a plurality of narrow band regions in which the IoT UE operates may be present in one subframe to perform multiplexing in a subframe between the IoT UEs, and different IoT UEs may use different narrow bands. In this case, most of IoT UEs may use a different narrow band other than a central region (e.g., six PRBs in the middle) of the system band of the cell. Therefore, IoT communication operating on a reduced bandwidth may be referred to as narrow band (NB) IoT communication or NB CIoT communication.

Meanwhile, some UEs may not support a handover as well as measurement reporting. For example, the UE not supporting the handover as well as the measurement reporting may be an NB IoT UE or a CIoT UE. Therefore, even though the UE not supporting the handover as well as the measurement reporting transmits an MBMS interest indication message to a network, the network cannot handover the UE at a frequency for providing an MBMS service of interest. That is, the existing MBMS service continuity mechanism based on the MBMS interest indication message is not able to provide the MBMS service continuity to the UEs not supporting the measurement reporting or the handover. Hereinafter, a method of supporting MBMS service continuity for the UE not supporting the handover or the measurement reporting and an apparatus supporting the method will be described according to an embodiment of the present invention.

In case of an MBMS capable UE not supporting the handover or the measurement reporting, the UE may transmit the MBMS interest indication message to the network only when at least one of the following first to fifth conditions is met. For example, the MBMS capable UE not supporting the handover or the measurement reporting may be at least any one of an NB-IoT UE, a CIoT UE, an IoT UE, and an eMTC UE.

1) First condition: The UE is in an RRC state that does not support UE-based mobility. For example, the UE-based mobility may be cell reselection. For example, the RRC state that does not support UE-based mobility may be an RRC_CONNECTED state. For example, the RRC state that does not support UE-based mobility may be a newly defined RRC state.

2) Second condition: The UE is interested in receiving an MBMS service via broadcasting. For example, the UE is interested in receiving the MBMS service via MBSFN transmission. For example, the UE is interested in receiving the MBMS service via SCPTM transmission.

3) Third condition: The UE is not able to receive the MBMS service via broadcasting from a serving frequency.

4) Fourth condition: The UE is capable of receiving the MBMS service via broadcasting from a neighboring frequency.

5) Fifth condition: One MBMS session the UE is receiving or interested to receive via an MRB or SC-MRB is ongoing or about to start.

Alternatively, in case of the MBMS capable UE not supporting the handover or the measurement reporting, if the UE is capable of receiving the MBMS service via broadcasting from the serving frequency, even if transmission of the MBMS interest indication message is triggered, the UE may not transmit the MBMS interest indication message to the network.

Figure 8:
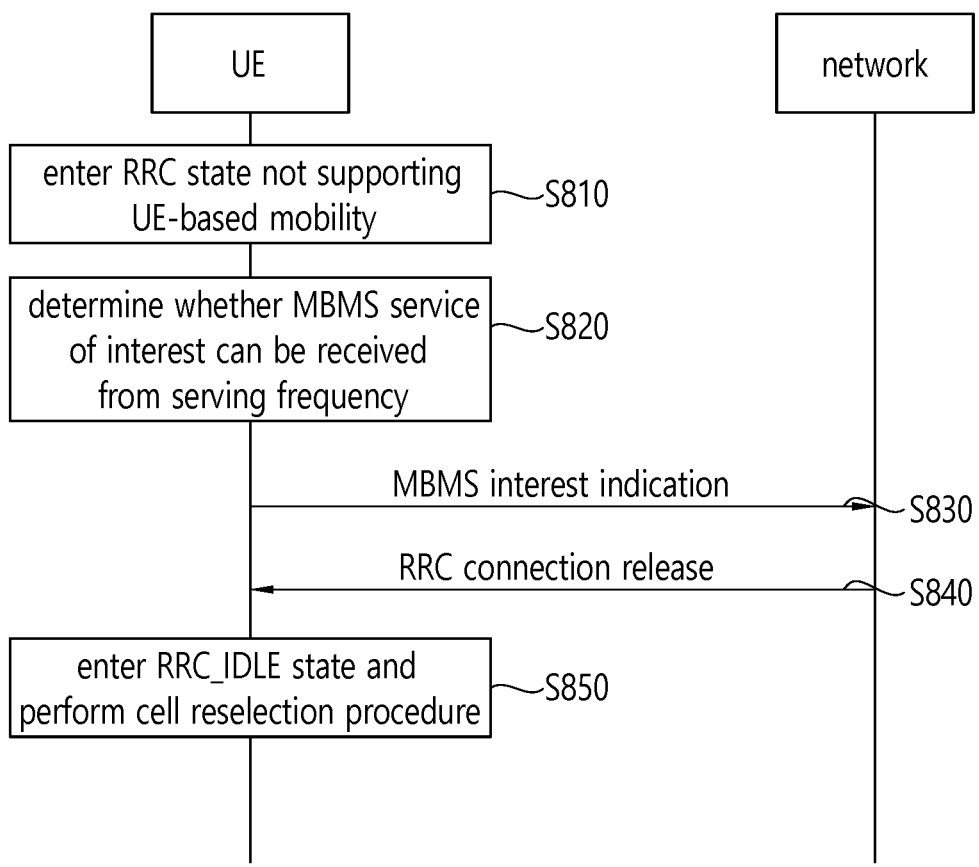
FIG. 8 shows a procedure in which a UE supports MBMS service continuity on the basis of an MBMS interest indication message according to an embodiment of the present invention.

FIG. 8 shows a procedure in which a UE supports MBMS service continuity on the basis of an MBMS interest indication message according to an embodiment of the present invention.

Referring to FIG. 8, in step S810, the UE may enter an RRC state that does not support UE-based mobility. For example, the RRC state that does not support UE-based mobility may be an RRC_CONNECTED state. For example, the RRC state that does not support UE-based mobility may be a newly defined RRC state.

In step S820, the UE may determine whether an MBMS service of interest can be received from a serving frequency. In addition, if it is determined that the MBMS service of interest cannot be received from the serving frequency, in step S830, the UE may transmit an MBMS interest indication message to a network. That is, a UE which is interested in receiving the MBMS service may first determine whether the MBMS service of interest can be received from the serving frequency, and thereafter may transmit the MBMS interest indication message to the network only when the MBMS service of interest cannot be received from the serving frequency. The MBMS interest indication may inform the network that the UE wants to enter an RRC_IDLE mode to change the serving frequency through the cell reselection procedure. Additionally, the MBMS interest indication message may further include additional information. The additional information may indicate that the UE wants to enter the RRC_IDLE mode to change the serving frequency through the cell reselection procedure. If it is determined that the MBMS service of interest can be received from the serving frequency, in step S830, the UE may not transmit the MBMS interest indication message to the network. That is, step S830 may be skipped.

In step S840, the network may transmit an RRC connection release message to the UE in response to the MBMS interest indication message. Alternatively, the network may transmit the RRC connection release message to the UE in response to the MBMS interest indication message including the additional information.

In step S850, upon receiving the RRC connection release message, the UE may enter the RRC_IDLE state and may perform the cell reselection procedure.

Specifically, upon receiving the RRC connection release message with a release cause 'MBMS service continuity' from the network, the UE may prioritize an MBMS frequency at which the MBMS service of interest is provided. Then, the UE may perform the cell reselection procedure. As a result, the UE may be camped on a cell which provides the MBMS service of interest.

Preferably, after the UE is camped on the cell which provides the MBMS service of interest, the UE may initiate an RRC connection establishment procedure to recover unicast communication.

For example, transmission of the MBMS interest indication message for the IoT UE may be initiated by the procedure defined in Table 3. If SIB15 is broadcast by a PCell and if the UE cannot receive the MBMS service of interest via SCTPM transmission or SCPTM transmission from a current serving frequency, the UE may initiate transmission of the MBMS interest indication message.

TABLE 3

An MBMS or SC-PTM capable UE in RRC_CONNECTED may initiate the procedure in several cases including upon successful connection establishment, upon entering or leaving the service area, upon session start or stop, upon change of interest, upon change of priority between MBMS reception and unicast reception or upon change to a PCell broadcasting SystemInformationBlockType15.
Upon initiating the procedure, the IoT UE shall:
if SystemInformationBlockType15 is broadcast by the PCell and if the UE cannot receive the MBMS service of interest via MBSFN transmission or SCPTM transmission from current serving frequency;
ensure having a valid version of SystemInformationBlockType15 for the PCell;
if the UE did not transmit an MBMSInterestIndication message since last entering RRC_CONNECTED state; or
2>    if since the last time the UE transmitted an MBMSInterestIndication message, the UE connected to a PCell not broadcasting SystemInformationBlockType15:
3>    if the set of MBMS frequencies of interest is not empty:
4>    initiate transmission of the MBMSInterestIndication message;
2>    else:
3>    if the set of MBMS frequencies of interest has changed since the last transmission of the MBMSInterestIndication message; or
3>    if the prioritisation of reception of all indicated MBMS frequencies compared to reception of any of the established unicast bearers has changed since the last transmission of the MBMSInterestIndication message:

TABLE 3-continued

```
4>       initiate transmission of the MBMSInterestIndication message;
NOTE:    The UE may send an MBMSInterestIndication even when it is able to receive the MBMS
services it is interested in i.e. to avoid that the network allocates a configuration inhibiting MBMS
reception.
3>       else if SystemInformationBlockType20 is broadcast by the PCell:
4>       if since the last time the UE transmitted an MBMSInterestIndication message, the UE
connected to a PCell not broadcasting SystemInformationBlockType20; or
4>       if the set of MBMS services of interest is different from mbms-Services included in the
last transmission of the MBMSInterestIndication message;
5>       initiate the transmission of the MBMSInterestIndication message.
```

According to an embodiment of the present invention, if the UE not supporting the handover is in the RRC state that does not support UE-based mobility, when the UE is unable to receive the MBMS service of interest from the serving frame, the UE may enter the RRC_IDLE state by transmitting the MBMS interest indication message to the network.

Figure 9:
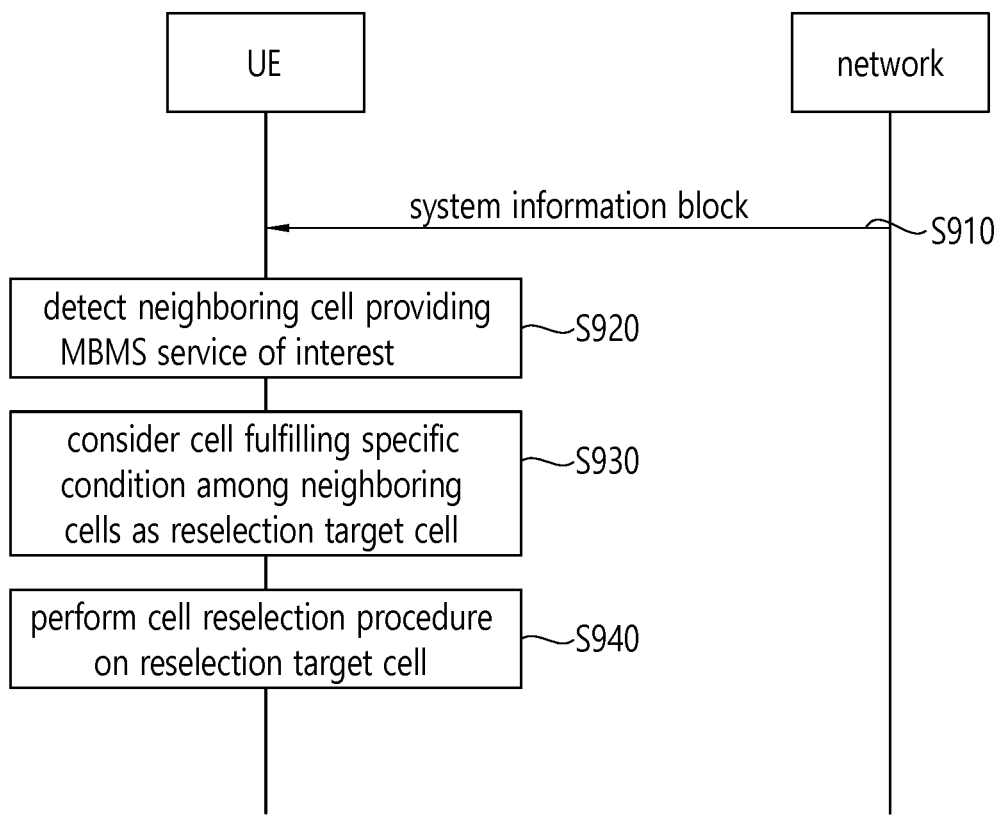
FIG. 9 shows a procedure in which a UE in an RRC_IDLE state performs cell reselection according to an embodiment of the present invention.

FIG. 9 shows a procedure in which a UE in an RRC_IDLE state performs cell reselection according to an embodiment of the present invention.

Referring to FIG. 9, in step S910, the UE may receive a system information block from a serving cell. The UE may be a UE in an RRC_IDLE state. In addition, the UE may be an UE which is interested in receiving an MBMS service. The UE may be at least any one of an NB-IoT UE, a CIoT UE, an IoT UE, and an eMTC UE. The eMTC UE may be a UE in improved coverage. The MBMS service may be received via SCPTM transmission or MBSFN transmission. The system information block may be SIB20.

In step S920, upon receiving the system information block from a serving cell, the UE may identify a neighboring cell providing the MBMS service of interest on the basis of information included in the system information block. The neighboring cell providing the MBSM service of interest may be plural in number.

In step S930, before performing cell reselection on all measured neighboring cells, the UE may determine whether the neighboring cell will be considered as a target cell for cell reselection. When at least any one of conditions 1 to 3 is met, the UE may consider the neighboring cell as the target of the cell reselection.

1) Condition 1: The neighboring cell provides the MBMS service of interest.

2) Condition 2: Quality of the neighboring cell exceeds a threshold.

3) Condition 3: The neighboring cell fulfills a cell selection criterion S. The cell selection criterion may be defined by Equation 1.

$$Srxlev>0 \text{ and } Squal>0 \qquad \text{[Equation 1]}$$

Srxlev denotes a cell selection RX level value (dB), and Squal denotes a cell selection quality value (dB).

In the first condition, the MBMS service of interest may be provided via SCPTM transmission or MBSFN transmission. In the second condition, quality of the neighboring cell may be at least any one of RSPR and RSRQ of the neighboring cell. In the second condition, the threshold may be at least any one of an RSRP threshold and an RSRQ threshold. The UE may receive the threshold from the network before step S930.

For example, before cell reselection for all measured neighboring cells, the UE may consider only a neighboring cell having quality exceeding a threshold among multiple neighboring cells providing an MBMS service of interest as a target cell.

For example, before cell reselection for all measured neighboring cells, the UE may consider only a neighboring cell, which fulfills a cell selection criterion S among the multiple neighboring cells providing the MBMS service of interest, as a target cell for cell reselection.

For example, if there is no neighboring cell which meets the above conditions, the UE may consider all neighboring cells as the target cell of cell reselection.

In step S940, the UE may perform a cell reselection procedure for a limited target cell. That is, the UE may not perform the cell reselection procedure for all neighboring cells providing the MBMS service of interest, but may perform the cell reselection procedure only for a neighboring cell which meets at least any one of the conditions 2 and 3 among all neighboring cells providing the MBMS service of interest. Thereafter, the UE may reselect a serving cell through cell reselection from among the limited target cells.

When the MBMS service of interest changes and thus the UE cannot receive the MBMS service of interest from the reselected serving cell via SCPTM transmission or MBSFN transmission, the UE may perform steps S910 to S940 again.

When the UE is no longer interested in receiving the MBMS service, the UE may perform the legacy cell reselection procedure. The legacy cell reselection procedure may be performed without limitation of the target cell.

According to an embodiment of the present invention, before cell reselection for all measured neighboring cells, the UE may consider only a neighboring cell, which meets a specific condition among multiple neighboring cells providing the MBMS service of interest, as the target cell for cell resection.

Figure 10:
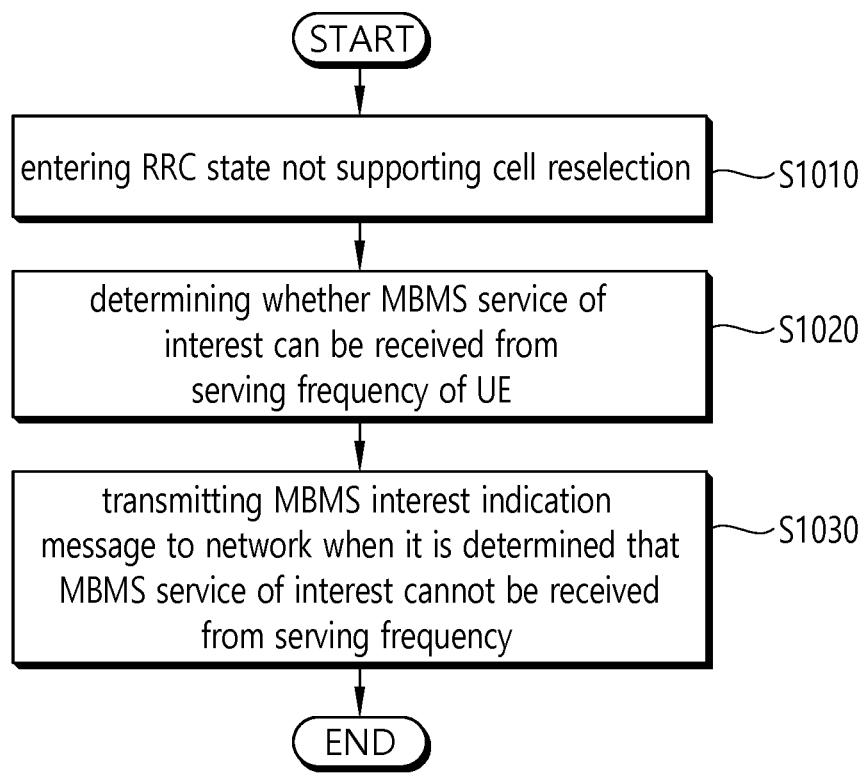
FIG. 10 is a block diagram showing a method in which a UE supports MBMS service continuity according to an embodiment of the present invention.

FIG. 10 is a block diagram showing a method in which a UE supports MBMS service continuity according to an embodiment of the present invention.

Referring to FIG. 10, in step S1010, the UE may enter an RRC state in which cell selection is not supported. The UE may be a UE not supporting a handover. The UE may be at least any one of an NB-IoT UE, a CIoT UE, an IoT UE, and an eMTC UE.

In step S1020, the UE may determine whether an MBMS service of interest can be received from a serving frequency of the UE.

In step S1030, if it is determined that the MBMS service of interest cannot be received from the serving frequency, the UE may transmit an MBMS interest indication message to a network. The network may be a radio access technology (RAT) not supporting the handover.

In addition, the UE may receive an RRC connection release message from the network in response to the transmitted MBSM interest indication message. In addition, the UE may enter an RRC_IDLE state in response to the received RRC connection release message. In addition, the UE may perform cell reselection to a neighboring cell providing the MBMS service of interest. In addition, the UE may receive the MBMS service of interest from the reselected neighboring cell. The MBMS service of interest may be received via MBSFN transmission or SCPTM transmission.

In addition, after the UE enters the RRC_IDLE state, the UE may receive a system information block from the serving frequency, and may determine the neighboring cell providing the MBMS service of interest on the basis of the system information block.

In addition, the UE may consider at least any one cell having cell quality exceeding a threshold among the neighboring cells providing the MBMS service of interest, as the target cell of the cell reselection. The threshold may be received from the serving frequency. The cell quality may be at least any one of RSRP or RSRQ. In addition, the UE may perform a cell reselection procedure on the considered at least one target cell.

In addition, the UE may consider at least any one cell, which fulfills a cell selection criterion S among the neighboring cells providing the MBMS service of interest, as the target cell of the cell reselection.

Figure 11:
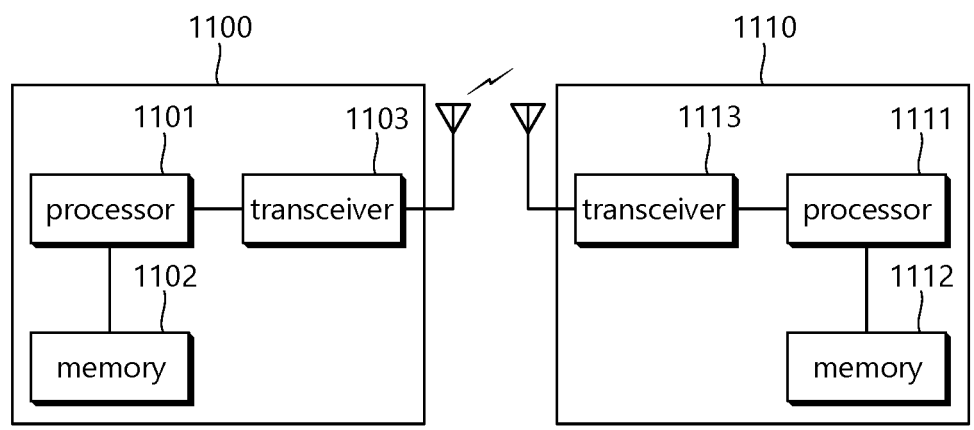
FIG. 11 is a block diagram illustrating a wireless communication system according to the embodiment of the present invention.

FIG. 11 is a block diagram illustrating a wireless communication system according to the embodiment of the present invention.

A BS 1100 includes a processor 1101, a memory 1102 and a transceiver 1103. The memory 1102 is connected to the processor 1101, and stores various information for driving the processor 1101. The transceiver 1103 is connected to the processor 1101, and transmits and/or receives radio signals. The processor 1101 implements proposed functions, processes and/or methods. In the above embodiment, an operation of the BS may be implemented by the processor 1101.

A UE 1110 includes a processor 1111, a memory 1112 and a transceiver 1113. The memory 1112 is connected to the processor 1111, and stores various information for driving the processor 1111. The transceiver 1113 is connected to the processor 1111, and transmits and/or receives radio signals. The processor 1111 implements proposed functions, processes and/or methods. In the above embodiment, an operation of the UE may be implemented by the processor 1111.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of supporting multimedia broadcast multicast service (MBMS) service continuity by a user equipment (UE) in a wireless communication system, the method comprising:
   entering a radio resource control (RRC) state in which cell reselection is not supported;
   determining whether an MBMS service of interest can be received from a serving frequency for the UE; and
   when it is determined that the MBMS service of interest cannot be received from the serving frequency, transmitting an MBMS interest indication message to a network,
   wherein the UE is a UE not supporting a handover.

2. The method of claim 1, further comprising:
   receiving from the network an RRC connection release message in response to the transmitted MBMS interest indication message.

3. The method of claim 2, further comprising:
   entering an RRC_IDLE state in response to the received RRC connection release message.

4. The method of claim 3, further comprising:
   performing cell reselection to a neighboring cell providing the MBMS service of interest.

5. The method of claim 4, further comprising:
   receiving the MBMS service of interest from the reselected neighboring cell.

6. The method of claim 5, wherein the MBMS service of interest is received via multimedia broadcast single frequency network (MBSFN) transmission or single cell point to multipoint (SCPTM) transmission.

7. The method of claim 3, further comprising:
   receiving a system information block from the serving frequency after entering the RRC_IDLE state; and
   determining a neighboring cell providing the MBMS service of interest on the basis of the system information block.

8. The method of claim 7, further comprising:
   considering at least any one cell having cell quality exceeding a threshold among the neighboring cells providing the MBMS service of interest, as a target cell of cell reselection.

9. The method of claim 8, wherein the threshold is received from the serving frequency.

10. The method of claim 8, wherein the cell quality is at least any one of reference signal received power (RSRP) and reference signal received quality (RSRQ).

11. The method of claim 8, further comprising:
    performing a cell reselection procedure on the considered at least one target cell.

12. The method of claim 7, further comprising:
    considering at least any one cell, which fulfills a cell selection criterion S among the neighboring cells providing the MBMS service of interest, as the target cell of the cell reselection.

13. The method of claim 1, wherein the network is a radio access technology (RAT) not supporting the handover.

14. The method of claim 1, wherein the UE is at least any one of an NB-IoT UE, a CIoT UE, an IoT UE, and an eMTC UE.

15. A user equipment (UE) supporting multimedia broadcast multicast service (MBMS) service continuity in a wireless communication system, the UE comprising:
- a memory; a transceiver; and a processor coupling the memory and the transceiver, wherein the processor is configured to:
- enter a radio resource control (RRC) state in which cell reselection is not supported;
- determine whether an MBMS service of interest can be received from a serving frequency for the UE; and
- when it is determined that the MBMS service of interest cannot be received from the serving frequency, control the transceiver to transmit an MBMS interest indication message to a network,
- wherein the UE is a UE not supporting a handover.

* * * * *